United States Patent [19]

Schott

[11] Patent Number: 4,616,952
[45] Date of Patent: Oct. 14, 1986

[54] SHAFT COUPLING LOCKABLE IN THE RELEASED POSITION

[75] Inventor: Wilhelm Schott, Hennef/Sieg, Fed. Rep. of Germany

[73] Assignee: Jean Walterscheid GmbH, Lohmar/Rhld., Fed. Rep. of Germany

[21] Appl. No.: 816,459

[22] Filed: Jan. 6, 1986

[30] Foreign Application Priority Data

Jan. 16, 1985 [DE] Fed. Rep. of Germany ....... 3501262

[51] Int. Cl.[4] .............................................. F16B 7/00
[52] U.S. Cl. .................................. 403/316; 403/325; 403/328
[58] Field of Search ................ 403/322, 328, 316, 325

[56] References Cited

U.S. PATENT DOCUMENTS 4,402,626  9/1983  Recker ............................... 403/328
4,464,077  8/1984  Herchenbach et al. ........ 403/325 X

FOREIGN PATENT DOCUMENTS 3337797  4/1985  Fed. Rep. of Germany .
2148454  5/1985  United Kingdom .

Primary Examiner—Andrew V. Kundrat
Attorney, Agent, or Firm—Toren, McGeady, Stanger, Goldberg & Kiel

[57] ABSTRACT

A shaft coupling joining together a coupling sleeve and a power takeoff shaft, wherein a plurality of locking bodies guided in radial openings in the coupling sleeve engage within an annular groove in the power takeoff shaft to axially retain the members coupled together. An axially movable lock ring holds the locking bodies in engagement within the annular groove and when in the released position a gripping sleeve axially fixed with the lock ring, but rotatable relative thereto extending about the coupling sleeve, is engaged within the radial openings of the coupling sleeve to hold the coupling in the released position. The gripping sleeve is formed with an annular part extending axially inwardly of the gripping sleeve, a radially inwardly directed hooked projection provided on the annular part and a plurality of longitudinally extending slots uniformly circumferentially distributed on the annular part dividing it into a plurality of individual radially inwardly extending locking brackets having hooked projections formed thereon engaging within the radial openings. The quantity of the locking brackets provided is divisible by the quantity of the radial openings and the width of the locking brackets in the circumferential direction corresponds to no more than half the corresponding width of an opening.

2 Claims, 2 Drawing Figures

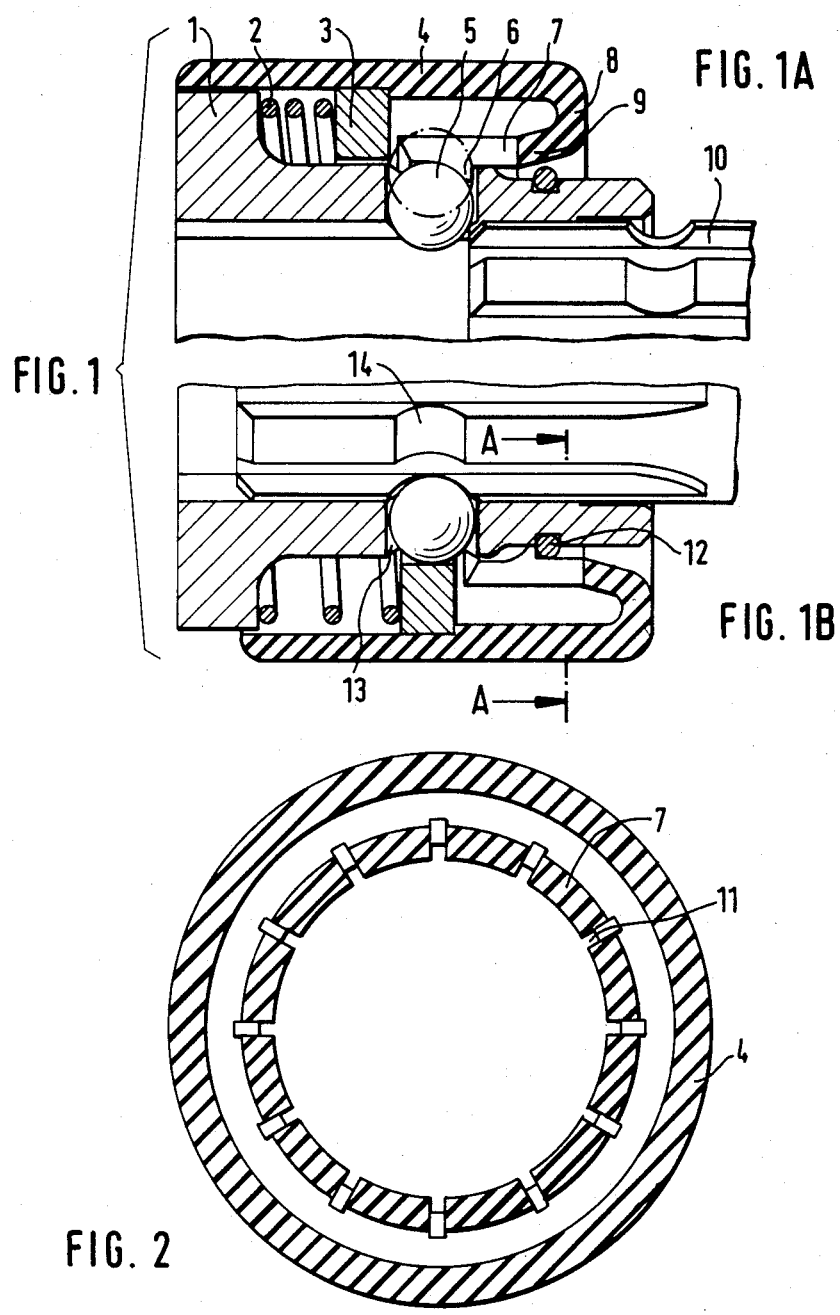

SHAFT COUPLING LOCKABLE IN THE RELEASED POSITION

The invention is directed to a releasable shaft coupling and more particularly to a coupling which may be locked in the released position.

More specifically, the invention is directed to a coupling of the type for connecting two shaft parts, particularly the coupling sleeve of a universal joint and the power takeoff shaft of a tractor for connecting an agricultural device or trailer with a tractor. The coupling mechanism consists of locking bodies guided in radial openings of the coupling sleeve, and a lock ring which, in the locking position, embraces the locking bodies engaging in an annular groove of the power takeoff shaft. The lock ring is acted upon by the force of a spring in the locking position and is connected with a gripping sleeve so as to be rotatable, but not axially displaceable relative to it, the gripping sleeve encompassing the lock ring.

A shaft coupling which is lockable in the open position is known from P 33 37 797.9 (Federal Republic of Germany) in which separate locking latches, pawls or ratchets are provided which engage behind a bent portion of the gripping sleeve and lock the latter in the released position.

However, it is a disadvantage of this construction that an additional structural part, namely the locking latch, is required, and the gripping sleeve is not connected with the coupling sleeve in the locked released position so as to be nonrotatable relative to it. This is especially disadvantageous when coupling the universal joint, since the latter must often be turned by a small degree in order to attach it to the power takeoff shaft.

The invention is directed toward providing a shaft coupling which is lockable in the released position and in which no additional structural parts are used than are used in a conventional shaft coupling and in which the gripping sleeve is connected with the coupling sleeve in the locked released position so as to be nonrotatable relative to it and is rotatably supported on the coupling sleeve in the locking position in order to prevent accidents, and further, wherein, the overall dimensioning of the shaft coupling is kept extremely small.

SUMMARY OF THE INVENTION

Briefly, the present invention may be described as a shaft coupling which may be locked in a released position particularly for connecting an agricultural implement with a tractor comprising a coupling sleeve, a power takeoff shaft, a plurality of locking bodies guided in radial openings in the coupling sleeve for engaging within an annular groove in the power takeoff shaft to axially retain the coupling sleeve and the power takeoff shaft connected together, a lock ring movable on the coupling sleeve between a locking position holding the locking bodies in engagement within the annular groove and a release position enabling the coupling sleeve to be released from the power takeoff shaft, spring means urging the lock ring toward the locking position and a gripping sleeve axially fixed with the lock ring, but rotatable relative thereto extending about the coupling sleeve.

In accordance with the invention, the gripping sleeve is provided at its end facing the attachment side of the coupling sleeve with an annular part extending axially into the gripping sleeve proceeding from a radially inwardly extending projection. A radially inwardly directed hook-like projection is provided at the inner end of the annular part, and the annular part with the hook-like projection is divided into individual radially inwardly directed resilient locking brackets by means of longitudinally extending slots which are uniformly distributed around the circumference of the annular part. The width of the locking brackets in the circumferential direction is smaller than the corresponding width of the opening, and the quantity of locking brackets is divisible by the quantity of openings.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE DRAWINGS

In the drawings:

FIG. 1 is a longitudinal section through the shaft coupling of the invention, divided into an upper half FIG. 1A and a lower half FIG. 1B, with the upper half showing the locked released position and with the lower half showing the engaged position;

FIG. 2 is a cross-section through the gripping sleeve with the locking brackets taken along the line A—A of FIG. 1.

DETAILED DESCRIPTION OF THE PREFERRED EMBODIMENT

Referring now to the drawings, there is shown an embodiment of the invention which comprises a shaft coupling mechanism for joining together a coupling sleeve 1 with a power takeoff shaft 10. The coupling sleeve 1 may be a connecting member extending from a universal joint of an agricultural implement or trailer. The power takeoff shaft 10 may be a shaft of a tractor adapted to drive the coupling sleeve. The coupling sleeve 1 and the power takeoff shaft 2 are formed with splines, whereby they may be engaged for torque transmission with each other. The upper half of FIG. 1, labelled FIG. 1A, shows the released position of the assembly where the power takeoff shaft 10 is not as yet fully inserted into the coupling sleeve 1. The lower half of FIG. 1, labelled FIG. 1B, shows the engaged position of the coupling assembly, wherein the power takeoff shaft 10 is fully inserted into the coupling sleeve 1 and is locked so as to be maintained in torque transmitting engagement therewith.

The present invention is particularly directed toward a device for locking the coupling assembly in the released position shown in FIG. 1A.

The coupling sleeve 1 is provided with several, and preferably three, radial openings 13 in which locking bodies 5 are guided so as to be radially displaceable. A lock ring 3 is guided on the coupling sleeve 1. A spring 2, which acts upon the lock ring 3 in the locking position direction, i.e., in the direction toward the openings 13, is arranged between the lock ring 3 and a stop at the coupling sleeve 1. A gripping sleeve 4 encompasses the lock ring 3 with radial play. A shoulder is provided within the gripping sleeve 4 against which the lock ring 3 engages so as to be supported against the force of the spring 2. Accordingly, a conforming movement of the lock ring 3 and the gripping sleeve 4 is insured in the axial direction.

The gripping sleeve 4 has a radially inwardly directed projection 8 at its end facing the attaching side of the sleeve 1, with an annular part 9 extending axially into the gripping sleeve 4 being arranged at the projection 8. Slots 11, which divide the annular part 9 into locking brackets 7, are arranged at the axially inwardly directed area of the annular part 9. The locking brackets 7 comprise hook-like projections 6 with which they are supported within the openings 13 in the locked released position of the shaft coupling.

The locking brackets 7 are simultaneously supported in the locked open position at the outer circumference of the locking bodies 5, which are constructed here as balls.

By means of sliding the power takeoff shaft 10 into the receiving borehole of the coupling sleeve 1, the locking bodies 5 are displaced radially outwardly by the power takeoff shaft 10 and the hook-like projections 6 are accordingly pushed outwardly out of the openings 13 by means of which the locked released position is disengaged and the lock ring 3 can skip over the locking bodies 5 as soon as the locking bodies 5 can fall into an annular groove 14 of the power takeoff shaft 10.

The hook-like projections 6 of the locking brackets 7 are supported in the locking position at a snap ring 12 at the coupling sleeve 1.

In the construction according to the invention, it is advantageous that the gripping sleeve is constructed simultaneously as a holding element for maintaining the locked released position in that the resilient locking brackets assigned to it engage in the openings 13 of the coupling sleeve.

By means of sliding the coupling sleeve onto the power takeoff shaft 10, the locking bodies 5 are moved radially outwardly and the locking brackets 7 are accordingly pressed radially outwardly out of their position in contact with the openings 13 of the coupling sleeve so that the shaft coupling can move into the locking position.

In the preferred embodiment of the invention, it is provided that the width of the locking brackets 7 in the circumferential direction corresponds at most to half the corresponding width of an opening 13.

In this construction of the shaft coupling, according to the invention, it is insured that at least one locking bracket 7 of the gripping sleeve 4 catches in an opening 13 of the coupling sleeve 1 independently of the angular position.

Accordingly, it will be seen that the invention provides a shaft coupling which is lockable in the released position, shown in FIG. 1A, without requiring any more structural parts than are used in a conventional shaft coupling and in which the gripping sleeve 4 is connected with the coupling sleeve 1 so as to be nonrotatable relative to it in the locked released position and is rotatably supported on the coupling sleeve in the locking position in order to prevent accidents.

This object is met according to the invention in that the gripping sleeve 4 is provided with an annular part 9, which extends axially into the gripping sleeve 4, at its end facing the attaching side of the coupling sleeve 1, proceeding from a radially inwardly extending projection 8, and in that a radially inwardly directed hook-like projection 6 is provided at the inner end of the annular part 9. The annular part 9 with the hook-like projection 6 is divided into individual radially inwardly resilient locking brackets 7 by means of longitudinally extending slots 11 which are uniformly distributed on the circumference, and the width of the locking brackets 7 in the circumferential direction is smaller than the corresponding width of the opening 13, with the quantity of locking brackets 7 being divisible by the quantity of openings 13.

While a specific embodiment of the invention has been shown and described in detail to illustrate the application of the inventive principles, it will be understood that the invention may be embodied otherwise without departing from such principles.

What is claimed is:

1. A shaft coupling lockable in a released position for releasably coupling two shaft members particularly for connecting an agricultural implement with a tractor, comprising:

a coupling sleeve having radial openings therein and an attachment side;

a power takeoff shaft having an annular groove therein adapted to be connected with said coupling sleeve from said attachment side;

a plurality of locking bodies guided in said radial openings of said coupling sleeve engaging within said annular groove to axially retain said coupling sleeve and said power takeoff shaft connected;

a lock ring axially movable on said coupling sleeve between a locking position holding said locking bodies in engagement within said annular groove and a released position enabling said coupling sleeve to be released from said power takeoff shaft;

spring means urging said lock ring toward said locking position;

a gripping sleeve axially fixed with said lock ring but rotatable relative thereto extending about said coupling sleeve;

a radially inwardly extending projection on said gripping sleeve located on an end thereof facing said attachment side of said coupling sleeve;

an annular part on said coupling sleeve extending from said projection axially inwardly of said gripping sleeve;

a radially inwardly directed hooked projection provided at an inner end of said annular part; and a plurality of longitudinally extending slots uniformly circumferentially distributed on said annular part dividing said annular part and said hooked projection thereon into a plurality of individual radially inwardly extending locking brackets, each having a circumferential width which is smaller than the circumferential size of said radial openings;

the quantity of said locking brackets being divisible by the quantity of said radial openings.

2. A shaft coupling according to claim 1, wherein said locking brackets have a width in the circumferential direction which corresponds to not more than half the corresponding width of said radial openings.

* * * * *